United States Patent
Maaref et al.

(10) Patent No.: US 12,306,312 B2
(45) Date of Patent: May 20, 2025

(54) MACHINE LEARNING IN GNSS RECEIVERS FOR IMPROVED VELOCITY OUTPUTS

(71) Applicant: oneNav, Inc., Palo Alto, CA (US)

(72) Inventors: Mahdi Maaref, Mountain View, CA (US); Lionel Garin, Palo Alto, CA (US)

(73) Assignee: oneNav, Inc., Sunnyvale, CA (US)

( * ) Notice: Subject to any disclaimer, the term of this patent is extended or adjusted under 35 U.S.C. 154(b) by 438 days.

(21) Appl. No.: 17/806,045

(22) Filed: Jun. 8, 2022

(65) Prior Publication Data

US 2023/0126547 A1 Apr. 27, 2023

Related U.S. Application Data (60) Provisional application No. 63/285,823, filed on Dec. 3, 2021, provisional application No. 63/243,028, filed (Continued)

(51) Int. Cl.
*G01S 19/13* (2010.01)
*G01S 19/39* (2010.01)
(Continued)

(52) U.S. Cl.
CPC ............ *G01S 19/13* (2013.01); *G01S 19/396* (2019.08); *G01S 19/52* (2013.01); *G06N 3/08* (2013.01); *G06N 3/084* (2013.01)

(58) Field of Classification Search
USPC ......................................................... 702/152
See application file for complete search history.

(56) References Cited

U.S. PATENT DOCUMENTS

| | | |
|---|---|---|
| 5,717,406 A | 2/1998 | Sanderford et al. |
| 9,562,770 B2 | 2/2017 | Garin |
| | (Continued) | |

FOREIGN PATENT DOCUMENTS

| | | |
|---|---|---|
| CN | 112099058 A | 12/2020 |
| CN | 112902989 A | 6/2021 |
| | (Continued) | |

OTHER PUBLICATIONS

Hoque, Mainul and Jakowski, N. "Estimate of higher order ionospheric errors in GNSS positioning", Radio Science, vol. 43, RS5008, doi:10.1029/2007RS003817, Oct. 9, 2008 (15 pages).
(Continued)

*Primary Examiner* — Paul D Lee
(74) *Attorney, Agent, or Firm* — WOMBLE BOND DICKINSON (US) LLP (57) ABSTRACT

Machine learning techniques are used to compute predicted range rate errors in a GNSS receiver. In one embodiment, training data is computed to provide true range rate error data for a set of received GNSS signals. A system extracts features from the set of received GNSS signals and uses the extracted features and the true range rate error data to train a model (e.g., a set of one or more neural networks) that can produce predicted range rate errors for use in correcting measurements. The trained set of one or more neural networks can be deployed in GNSS receivers and used in the GNSS receivers to correct Doppler measurements using the predicted range rate errors provided by the trained set of one or more neural networks.

7 Claims, 5 Drawing Sheets

Related U.S. Application Data on Sep. 10, 2021, provisional application No. 63/216,905, filed on Jun. 30, 2021.

(51) Int. Cl.
    *G01S 19/52*    (2010.01)
    *G06N 3/08*     (2023.01)
    *G06N 3/084*    (2023.01)

(56) References Cited

U.S. PATENT DOCUMENTS

| | | | |
|---|---|---|---|
| 9,945,956 | B2 | 4/2018 | Chhokra et al. |
| 11,275,179 | B1 | 3/2022 | Diggelen et al. |
| 11,402,514 | B2* | 8/2022 | Sun .................. G01S 19/40 |
| 2005/0134440 | A1 | 6/2005 | Breed |
| 2007/0200754 | A1 | 8/2007 | Fuchs et al. |
| 2011/0182515 | A1* | 7/2011 | Iwai .................. G06V 10/464 |
| | | | 382/190 |
| 2012/0249367 | A1 | 10/2012 | Bryant et al. |
| 2018/0324740 | A1 | 11/2018 | Edge et al. |
| 2019/0257953 | A1 | 8/2019 | Lennen |
| 2019/0384304 | A1 | 12/2019 | Towal et al. |
| 2020/0049837 | A1* | 2/2020 | Werner .................. G06N 20/20 |
| 2020/0151288 | A1 | 5/2020 | Ma et al. |
| 2020/0326430 | A1 | 10/2020 | Nichols et al. |
| 2021/0041571 | A1 | 2/2021 | Fischer et al. |
| 2021/0095965 | A1 | 4/2021 | Zhao et al. |
| 2021/0302597 | A1 | 9/2021 | Rezaei |
| 2022/0066046 | A1 | 3/2022 | Diggelen et al. |
| 2022/0066048 | A1 | 3/2022 | Diggelen et al. |
| 2022/0066053 | A1 | 3/2022 | Maggiolo et al. |
| 2022/0099841 | A1 | 3/2022 | Farmer et al. |
| 2022/0107184 | A1 | 4/2022 | Omr et al. |
| 2022/0137236 | A1 | 5/2022 | Conflitti et al. |
| 2023/0057518 | A1 | 2/2023 | Chen et al. |

FOREIGN PATENT DOCUMENTS

| | | |
|---|---|---|
| KR | 20200116729 A | 10/2020 |
| WO | 2020248200 A1 | 12/2020 |
| WO | 2021029869 A1 | 2/2021 |
| WO | 2021095270 A1 | 5/2021 |

OTHER PUBLICATIONS

PCT International Search Report and Written Opinion from related PCT Application No. PCT/US2022/33617, mailed Sep. 12, 2022 (22 pages).

Hartrampf, Mark et al. "LION Navigator for Transfer to GEO Using Electric Propulsion." (Sep. 18, 2015), 18 pages, https://elib.dlr.de/100291/1/ION_15_F67_Hartrampf_LION_HEO.pdf.

Hauschild, André. "Chapter 20: Combination of Observations", in Springer Handbook of Global Navigation Satellite Systems, edited by Peter J.G. Teunissen and Oliver Montenbruck (Jul. 25, 2021), pp. 583-604, doi: 10.1007/978-3-319-42928-1.

Hoque, M. M., and N. Jakowski. "Ionospheric bending correction for GNSS radio occultation signals", Radio Science, vol. 46, RSOD06 (Jul. 6, 2011), 9 pages, doi:10.1029/2010RS004583.

Najmafshar, M. et al. "Characterizing Ionospheric Scintillation for Future GNSS Radio Occultation Missions," Proceedings of the 28th International Technical Meeting of the Satellite Division of The Institute of Navigation (ION GNSS+ 2015), Tampa, Florida, Sep. 2015, pp. 3808-3818.

O'Brien, Andrew. "Adaptive Antenna Arrays for Precision GNSS Receivers." Doctoral dissertation, Ohio State University, 2009. http://rave.ohiolink.edu/etdc/view?acc_num=osu1259170076.

PCT International Search Report and Written Opinion from related PCT Application No. PCT/US2022/033560, mailed Nov. 4, 2022, 17 pages.

PCT International Preliminary Report on Patentability from related PCT Application No. PCT/US2022/033560, mailed Jan. 11, 2024, 13 pages.

PCT International Search Report and Written Opinion from related PCT Application No. PCT/US2022/033584, mailed Oct. 27, 2022, 11 pages.

PCT International Preliminary Report on Patentability from related PCT Application No. PCT/US2022/033584, mailed Jan. 11, 2024, 10 pages.

PCT International Preliminary Report on Patentability from related PCT Application No. PCT/US2022/033617, mailed Jan. 11, 2024, 20 pages.

Turetzky, G. et al. "A Pure L5 Mobile Receiver", Inside GNSS (Sep. 30, 2020), 4 pages, https://insidegnss.com/a-pure-l5-mobile-receiver/.

Xu, H. et al. Machine learning based LOS/NLOS classifier and robust estimator for GNSS shadow matching. Satell Navig 1:15 (May 11, 2020), 12 pages, https://doi.org/10.1186/s43020-020-00016-w.

Yuan, Zhenyu et al. "Hybrid-DNNs: Hybrid Deep Neural Networks for Mixed Inputs", May 2020, 14 pages.

A. A. Abdallah and Z. M. Kassas, "Deep Learning-Aided Spatial Discrimination for Multipath Mitigation," 2020 IEEE/ION Position, Location and Navigation Symposium (PLANS) (Apr. 20-23, 2020), pp. 1324-1335, doi: 10.1109/PLANS46316.2020.9109935.

F. Dovis, R. Imam, W. Qin, C. Savas and H. Visser, "Opportunistic use of GNSS Signals to Characterize the Environment by Means of Machine Learning Based Processing," ICASSP 2020—2020 IEEE International Conference on Acoustics, Speech and Signal Processing (ICASSP) (May 4-8, 2020), pp. 9190-9194, doi: 10.1109/ICASSP40776.2020.9052924.

B. Guermah, H. E. Ghazi, T. Sadiki and H. Guermah, "A Robust GNSS LOS/Multipath Signal Classifier based on the Fusion of Information and Machine Learning for Intelligent Transportation Systems," 2018 IEEE International Conference on Technology Management, Operations and Decisions (ICTMOD) (Nov. 21-23, 2018), pp. 94-100, doi: 10.1109/ITMC.2018.8691272.

L.T. Hsu, "GNSS multipath detection using a machine learning approach," 2017 IEEE 20th International Conference on Intelligent Transportation Systems (ITSC) (Oct. 2017), pp. 1-6, doi: 10.1109/ITSC.2017.8317700.

Munin, Evgenii & Blais, Antoine & Couellan, Nicolas. Convolutional Neural Network for Multipath Detection in GNSS Receivers. arXiv:1911.02347v1 [eess.SP] (Nov. 6, 2019), pp. 1-10, https://doi.org/10.48550/arXiv.1911.02347.

M. Orabi, J. Khalife, A. A. Abdallah, Z. M. Kassas and S. S. Saab, "A Machine Learning Approach for GPS Code Phase Estimation in Multipath Environments," 2020 IEEE/ION Position, Location and Navigation Symposium (PLANS), (Apr. 20-23, 2020), pp. 1224-1229, doi: 10.1109/PLANS46316.2020.9110155.

Qin, Honglei & Xue, Xia & Yang, Qian. GNSS multipath estimation and mitigation based on particle filter. IET Radar, Sonar & Navigation, vol. 13, Issue 9 (Sep. 1, 2019), pp. 1588-1596. https://doi.org/10.1049/iet-rsn.2018.5587.

Quan Y, Lau L, Roberts GW, Meng X, Zhang C. Convolutional Neural Network Based Multipath Detection Method for Static and Kinematic GPS High Precision Positioning. Remote Sensing. (Dec. 17, 2018), 10(12):2052. https://doi.org/10.3390/rs10122052.

Savas, Caner, Dovis, Fabio, "Multipath Detection based on K-means Clustering," Proceedings of the 32nd International Technical Meeting of the Satellite Division of The Institute of Navigation (ION GNSS+ 2019), Miami, Florida (Sep. 16-20, 2019), pp. 3801-3811, https://doi.org/10.33012/2019.17028.

Suzuki, Taro, Nakano, Yusuke, Amano, Yoshiharu, "NLOS Multipath Detection by Using Machine Learning in Urban Environments," Proceedings of the 30th International Technical Meeting of the Satellite Division of The Institute of Navigation (ION GNSS+ 2017), Portland, Oregon (Sep. 2017), pp. 3958-3967. https://doi.org/10.33012/2017.15291.

Suzuki T, Amano Y. NLOS Multipath Classification of GNSS Signal Correlation Output Using Machine Learning. Sensors. (Apr. 3, 2021), 21(7):2503. https://doi.org/10.3390/s21072503.

Yozevitch, R., Moshe, B. B., and Weissman, A. A Robust GNSS LOS/NLOS Signal Classifier. J Inst Navig, 63:429-442. (May 2016) doi: 10.1002/navi.166.

(56) References Cited

OTHER PUBLICATIONS

Non-final Office Action mailed on Jan. 28, 2025, from U.S. Appl. No. 17/806,110, 11 pages.
Examination report No. 1 from related Australian Patent Application No. 2022303020, dated Aug. 16, 2024, 4 pages.
Extended European Search Report from related European Application No. 22833895.0 mailed on Mar. 14, 2025, 10 pages.

* cited by examiner

MACHINE LEARNING IN GNSS RECEIVERS FOR IMPROVED VELOCITY OUTPUTS

BACKGROUND

This application claims the benefit of U.S. provisional patent application No. 63/285,823, which was filed Dec. 3, 2021 by Applicant oneNav, Inc. of Palo Alto, California and claims the benefit of U.S. provisional patent application No. 63/216,905, which was filed Jun. 30, 2021 by Applicant oneNav, Inc. of Palo Alto, California and claims the benefit of U.S. provisional patent application No. 63/243,028 filed on Sep. 10, 2021 by oneNav, Inc., and these US provisional patent applications are hereby incorporated herein by reference.

This disclosure relates to the field of systems that determine a position of a radio receiver, and in particular this disclosure relates to global navigation satellite system (GNSS) receivers, such as a GNSS receiver that can determine the position of the GNSS receiver from signals received from GNSS satellites (GNSS SVs).

It is known that multipath effects on GNSS signals can cause large errors in position calculations and velocity calculations in GNSS receivers. Multipath effects often occur in urban canyons where the same transmitted signal from a GNSS SV is reflected multiple times off surfaces of the buildings surrounding a street where a GNSS is located; diffraction effects can also occur causing a significantly polluted signal at the receiver. For example, the GNSS receiver in this case can receive both a line of sight (LOS) signal and multiple non-line of sight (NLOS) signals from the same SV. This can distort the pseudorange and Doppler measurements made in the GNSS receiver, often to the point that the GNSS receiver measures a pseudorange or Doppler that has significant error, resulting in a position solution that can be in error by more than 100 meters (100 m) or a velocity solution that can have significant error. This inaccuracy can result in situations in which a driver of a taxi service (e.g., Uber) is directed to the wrong side of the street by the GNSS receiver of the potential passenger who is waiting for the taxi service. This problem has been studied in the GNSS field, and many solutions have been proposed. This disclosure provides an improvement to GNSS receivers that provide velocity data for use in navigation solutions.

SUMMARY OF THE DESCRIPTION

Machine learning techniques are used in one embodiment to improve velocity measurements in a GNSS receiver, particularly when the GNSS receiver is surrounded by structures that create a multipath signal environment. In one embodiment, training data is generated to provide true range rate data for a set of received GNSS signals. A system extracts features from the set of received GNSS signals and uses the extracted features and the true range rate data to train a model such as a set of one or more neural networks that can produce a set of predicted range rate errors for use in correcting or weighting Doppler measurements, which in turn can be used to correct errors in derived or computed velocity values for the GNSS receiver. The trained set of one or more neural networks can be deployed in GNSS receivers and used in the GNSS receivers to correct velocity measurements using the predicted range rate errors provided by the trained set of neural networks. As is known in the art, range rate is the rate at which the range or distance between a GNSS satellite (SV) and a receiver changes over a particular period of time.

A method, according to one embodiment, to train a model for use in a GNSS receiver can include the following operations: receiving a set of GNSS signals through one or more antennas; computing a set of true range rate errors for the set of GNSS signals; extracting, from the set of GNSS signals, a set of features related to range rate errors; training a model using the set of true range rate errors and the set of features; and storing a set of trained weights based on the training to provide a trained model. In one embodiment, the trained model can include a set of one or more neural networks (e.g., one or more deep neural networks that have at least two hidden layers). In one embodiment, the set of features can include one or more of the following: (1) a statistical computation (e.g., a standard deviation) of carrier phase measurements; (2) a statistical computation (e.g., mean) of pseudorange measurements; (3) a carrier to noise density ratio (C/NO); (4) an elevation of a GNSS satellite; (5) a signal to noise ratio of GNSS signals; (6) a statistical computation (e.g., mean or standard deviation or both) of frequency of received GNSS signals; (7) a statistical computation (e.g., mean) of Doppler measurements; or (8) a statistical computation (e.g., standard deviation) of pseudorandom code phase measurements. Each of these features is for a particular signal from a particular GNSS SV, and in one embodiment, each processed signal from each SV has this set of extracted features. In one embodiment, the set of true range rate errors is computed by calculating the difference between a raw range rate measurement produced by the GNSS receiver and a predicted range rate that is based on a difference between a velocity of the GNSS receiver projected onto a line of sight vector to a GNSS satellite and a velocity of the GNSS satellite projected onto the line of sight vector to the GNSS satellite. In one embodiment, the predicted range rate is adjusted to account for clock drift in the GNSS satellite and clock drift in the GNSS receiver. In one embodiment, the training method can further include the following operations to prepare the data in the extracted features for the training process: pruning data in the set of features; balancing data in the set of features; and scaling data in the set of features.

A method of operating a GNSS receiver, according to an inference embodiment, can include the following operations: receiving, through one or more antennas, GNSS signals from one or more GNSS SVs; extracting a set of features from the received GNSS signals, the set of features being predetermined based on a trained model in the GNSS receiver and the set of features being related to range rate errors; applying the set of features as an input to the trained model; and generating, by the trained model, a set of one or more predicted range rate errors to correct one or more measurements (e.g., velocity measurement values) made by the GNSS receiver. In one embodiment, the method can further include the operation of: setting a pseudorange rate uncertainty based on the set of one or more predicted range rate errors. The set of one or more predicted range rate errors can be used to adjust for errors in Doppler measurements which in turn can be used to adjust for errors in velocity calculations that indicate the velocity of the GNSS receiver (e.g., in a GNSS receiver which uses measured Doppler values to compute the receiver's velocity). For example, the predicted range rate error for each GNSS signal can be used to weight Doppler measurements so that one or more Doppler measurements with the highest weight (because they have the lowest predicted range rate errors) are accorded the most weight in a solution for the GNSS receiver's velocity. In one embodiment, the trained model can include a set of one or more neural networks (e.g., one or more deep neural networks that have at least two hidden layers). In one embodiment, the set of features can include one or more of the following: (1) a statistical computation (e.g., a standard deviation) of carrier phase measurements; (2) a statistical computation (e.g., mean) of pseudorange measurements; (3) a carrier to noise density ratio (C/N0); (4) an elevation of a GNSS satellite; (5) a signal to noise ratio of GNSS signals; (6) a statistical computation (e.g., mean or standard deviation or both) of frequency of received GNSS signals; (7) a statistical computation (e.g., mean) of Doppler measurements; or (8) a statistical computation (e.g., standard deviation) of pseudorandom code phase measurements. Each of these features is for a particular signal from a particular GNSS SV, and in one embodiment, each processed signal from each SV has this set of extracted features. In one embodiment, the method according to this inference embodiment can include the further following operations: pruning data in the set of features; and balancing data in the set of features.

According to another aspect of this disclosure, a GNSS receiver can include the following: an antenna to receive GNSS signals from GNSS satellites (SVs); a radiofrequency (RF) front end coupled to the antenna to amplify the GNSS signals; an analog to digital converter (ADC) coupled to the RF front end to generate a digital representation of received GNSS signals; a baseband memory coupled to the ADC to store the digital representation; a GNSS processing system coupled to the baseband memory to process the received GNSS signals, the GNSS processing system including a set of correlators that provide outputs that include correlation outputs; wherein the GNSS processing system includes processing logic to extract a set of features from the received GNSS signals, the set of features being predetermined based on a trained model in the GNSS receiver and being related to range rate errors; wherein the GNSS processing system includes processing logic to apply the set of features as an input to the trained model; and wherein the GNSS processing system includes processing logic to generate, by the trained model, a set of one or more predicted range rate errors to correct one or more measurements or calculations (e.g., velocity calculations) made by the GNSS receiver. In one embodiment, the GNSS processing system can set a pseudorange rate uncertainty based on the set of one or more predicted range rate errors. The set of one or more predicted range rate errors can be used to adjust for errors in Doppler measurements which in turn can be used to adjust for errors in velocity calculations that indicate the velocity of the GNSS receiver (e.g., in a GNSS receiver which uses measured Doppler values to compute the receiver's velocity). In one embodiment, the trained model can include a set of one or more neural networks (e.g., one or more deep neural networks that have at least two hidden layers). In one embodiment, the set of features can include one or more of the following: (1) a statistical computation (e.g., a standard deviation) of carrier phase measurements; (2) a statistical computation (e.g., mean) of pseudorange measurements; (3) a carrier to noise density ratio (C/N); (4) an elevation of a GNSS satellite; (5) a signal to noise ratio of GNSS signals; (6) a statistical computation (e.g., mean or standard deviation or both) of frequency of received GNSS signals; (7) a statistical computation (e.g., mean) of Doppler measurements; or (8) a statistical computation (e.g., standard deviation) of pseudorandom code phase measurements. Each of these features is for a particular signal from a particular GNSS SV, and in one embodiment, each processed signal from each SV has this set of extracted features. In one embodiment, the processing logic can prune and balance data in the set of extracted features before applying the set of extracted features as an input to the trained model.

The aspects and embodiments described herein can include non-transitory machine readable media that can store executable computer program instructions that when executed cause one or more data processing systems (e.g., one or more GNSS processing systems and processing logic in a GNSS receiver) to perform the methods described herein when the computer program instructions are executed. The instructions can be stored in non-transitory machine readable media such as in dynamic random access memory (DRAM) which is volatile memory or in nonvolatile memory, such as flash memory or other forms of memory. The aspects and embodiments described herein can also be in the form of data processing systems, such as GNSS receivers or portions of GNSS receivers, that are built or programmed to perform these methods. For example, a data processing system can be built with hardware logic to perform these methods or can be programmed with a computer program to perform these methods and such a data processing system can be considered a GNSS processing system. Further, the embodiments described herein can use one or more GNSS receiver architectures (or components, methods or portions of such architectures) described in U.S. patent application Ser. No. 17/068,659, filed Oct. 12, 2020 by Paul Conflitti, et. al., with oneNav, Inc. as the Applicant and this patent application is hereby incorporated herein by reference and this patent application was published on May 5, 2022 under publication number US 2022/0137236. The methods and systems described herein to improve the accuracy of velocity calculations/outputs can be combined with the methods and systems described in U.S. provisional patent application No. 63/243,028 filed on Sep. 10, 2021 by oneNav so that the GNSS receiver can contain a trained model to provide EPL corrections (which can improve the positions provided by the receiver) and a trained model to provide predicted range rate errors.

The above summary does not include an exhaustive list of all embodiments and aspects in this disclosure. All systems, media, and methods can be practiced from all suitable combinations of the various aspects and embodiments summarized above and also those disclosed in the detailed description below.

BRIEF DESCRIPTION OF THE DRAWINGS

The present invention is illustrated by way of example and not limitation in the figures of the accompanying drawings in which like references indicate similar elements.

DETAILED DESCRIPTION

Various embodiments and aspects will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments.

Reference in the specification to "one embodiment" or "an embodiment" means that a particular feature, structure, or characteristic described in conjunction with the embodiment can be included in at least one embodiment. The appearances of the phrase "in one embodiment" in various places in the specification do not necessarily all refer to the same embodiment. The processes depicted in the figures that follow are performed by processing logic that comprises hardware (e.g. circuitry, dedicated logic, etc.), software, or a combination of both. Although the processes are described below in terms of some sequential operations, it should be appreciated that some of the operations described may be performed in a different order. Moreover, some operations may be performed in parallel rather than sequentially.

The methods and systems described in this disclosure can be used to mitigate multipath effects in GNSS receivers, which can improve the accuracy of position and velocity solutions provided by such GNSS receivers in various scenarios, including for example, urban canyons that often block many GNSS signals from GNSS SVs. This disclosure will begin with a description of the training of a model according to one or more embodiments and the use of the trained model in a GNSS receiver, and then the disclosure will provide a description of the generation of training data and an example of a model that uses a deep neural network (e.g., a neural network that includes 5 hidden layers).

Figure 1A:
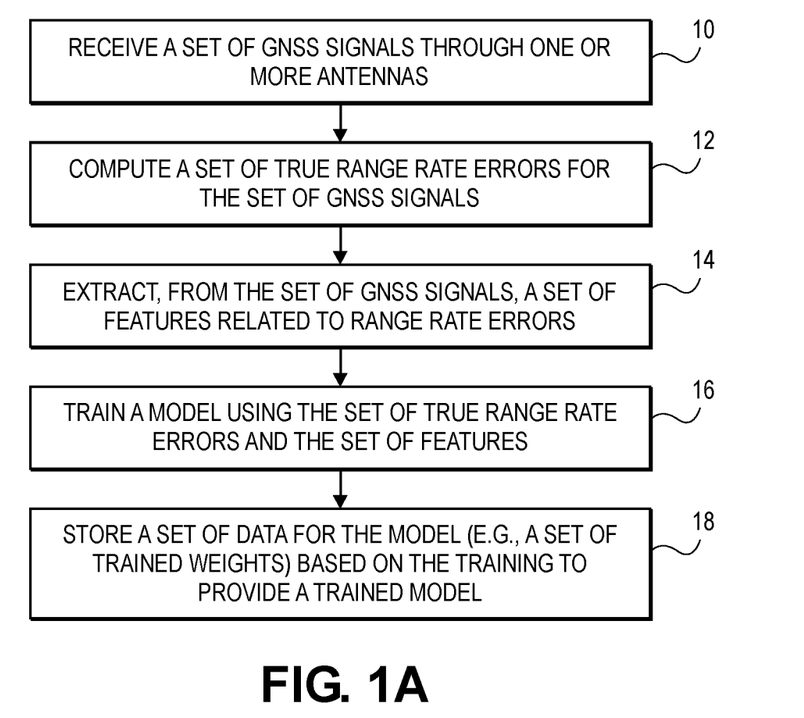
FIG. 1A is a flow chart that shows a method of training a model for use in a GNSS receiver according to one embodiment.

A general method for training a model for use in a GNSS receiver according to one embodiment is shown in FIG. 1A. The method can begin in operation 10 by receiving a set of GNSS signals from GNSS satellites (SVs) through one or more antennas. This reception can be part of operation 103 shown in FIG. 2A. The set of GNSS signals can be received by a GNSS receiver (which can be referred to as a device under test (DUT) GNSS receiver) that has an architecture (e.g., type of antenna and tracking loop and other features) that is intended to be used in a GNSS receiver at inference time (when a trained model is used). In operation 12, a processing system can compute a set of true range rate errors for the set of received GNSS signals. This computation of the set of true range rate errors is described further below. In one embodiment, this computation can include calculating the difference between a raw range rate measurement produced by a reference GNSS receiver and a predicted range rate that is based on a difference between a known velocity of the reference GNSS receiver projected onto a line of sight vector to a GNSS satellite and a velocity of the GNSS satellite projected onto the line of sight vector to the GNSS satellite. An example of a reference GNSS receiver is described in connection with a description of FIG. 2A below; in one embodiment, the reference GNSS receiver can be a high quality GNSS receiver that includes an inertial navigation system (INS) such as dead reckoning, and the reference GNSS receiver can be co-located with the DUT GNSS receiver (e.g., the DUT GNSS receiver and the reference GNSS receiver share the same GNSS antenna and are both situated in a vehicle which can roam an environment such as an urban canyon). In operation 14, a processing system can extract, from the same set of received GNSS signals (received in operation 10 and used in operation 12 to compute the set of true range rate errors), a set of features that are related to range rate errors.

The set of features can be values computed from the received set of GNSS signals (received in operation 10), such as one or more of the following: (1) a statistical computation (e.g., a standard deviation) of carrier phase measurements; (2) a statistical computation (e.g., mean) of pseudorange measurements; (3) a carrier to noise density ratio (C/N0); (4) an elevation of a GNSS satellite; (5) a signal to noise ratio of GNSS signals; (6) a statistical computation (e.g., mean or standard deviation or both) of frequency of received GNSS signals; (7) a statistical computation (e.g., mean) of Doppler measurements; or (8) a statistical computation (e.g., standard deviation) of pseudo-random code phase measurements. Each of these features is for a particular signal from a particular GNSS SV, and in one embodiment, each processed signal from each SV has this set of extracted features. An example is provided below about which features to use and how to select or set weights for those features. The set of features used during training is the same as the set of features used during inference (when the trained model is used). The data in the set of extracted features (from operation 14) and the computed true range rate data (from operation 12) are then used in operation 16 to train a machine learning model, such as a set of one or more neural networks (e.g., a set of deep neural networks, such as at least one neural network that has more than 2 hidden layers). The results of this training operation 16 can be stored in operation 18; for example, a set of trained weights that were obtained from the training operation can be stored as a model file (e.g., model file 309 in FIG. 5) for use by a trained model at inference time.

Figure 1B:
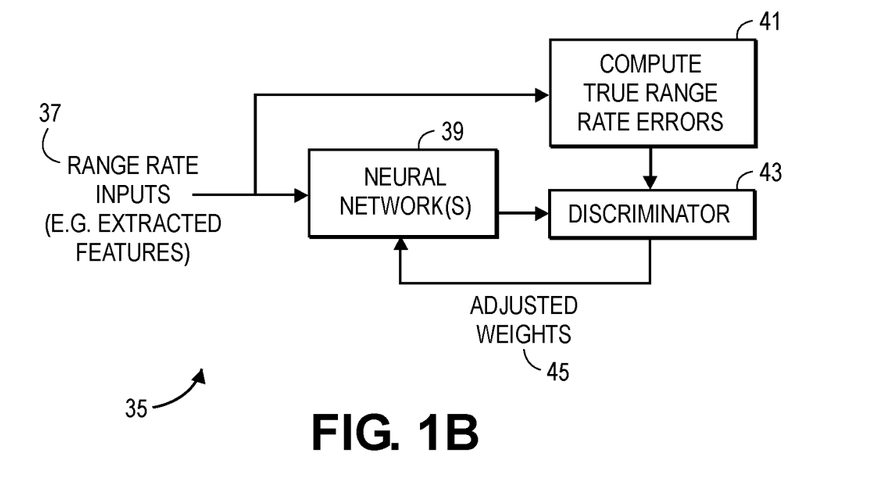
FIG. 1B shows an example of an embodiment that can be used to train a model.

FIG. 1B shows a general example of a system 35 to train a model according to one embodiment. This system 35 can receive collected data (e.g., from the method shown in FIG. 2A) and process the collected data to train a model, such as one or more deep neural networks. This system can use the method in FIG. 1A to create the trained model. The system 35 receives a set of range rate inputs 37 which can include the set of extracted features extracted in operation 14 of FIG. 1A. These range rate inputs 37 are applied as an input to the one or more neural networks 39, and a subset of these inputs 37 are provided to a processing system 41 that computes true range rate errors. Through a series of training epochs, the one or more neural networks 39 are trained by a discriminator 43 (also referred to as a machine learning performance evaluator) which generates adjusted weights 45 that are back propagated, using techniques known in the machine learning art, through the one or more neural networks 39. The discriminator can use a training threshold to determine when the adjusted weights have converged to an adequate solution.

Figure 2A:
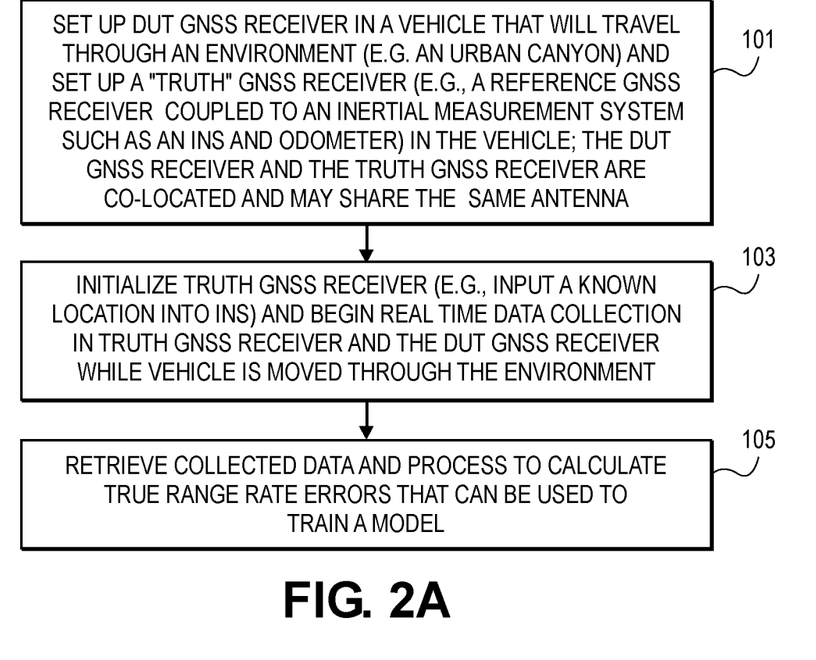
FIG. 2A is a flowchart that shows an embodiment for generating training data and generating true range rate error data.
Figure 2B:
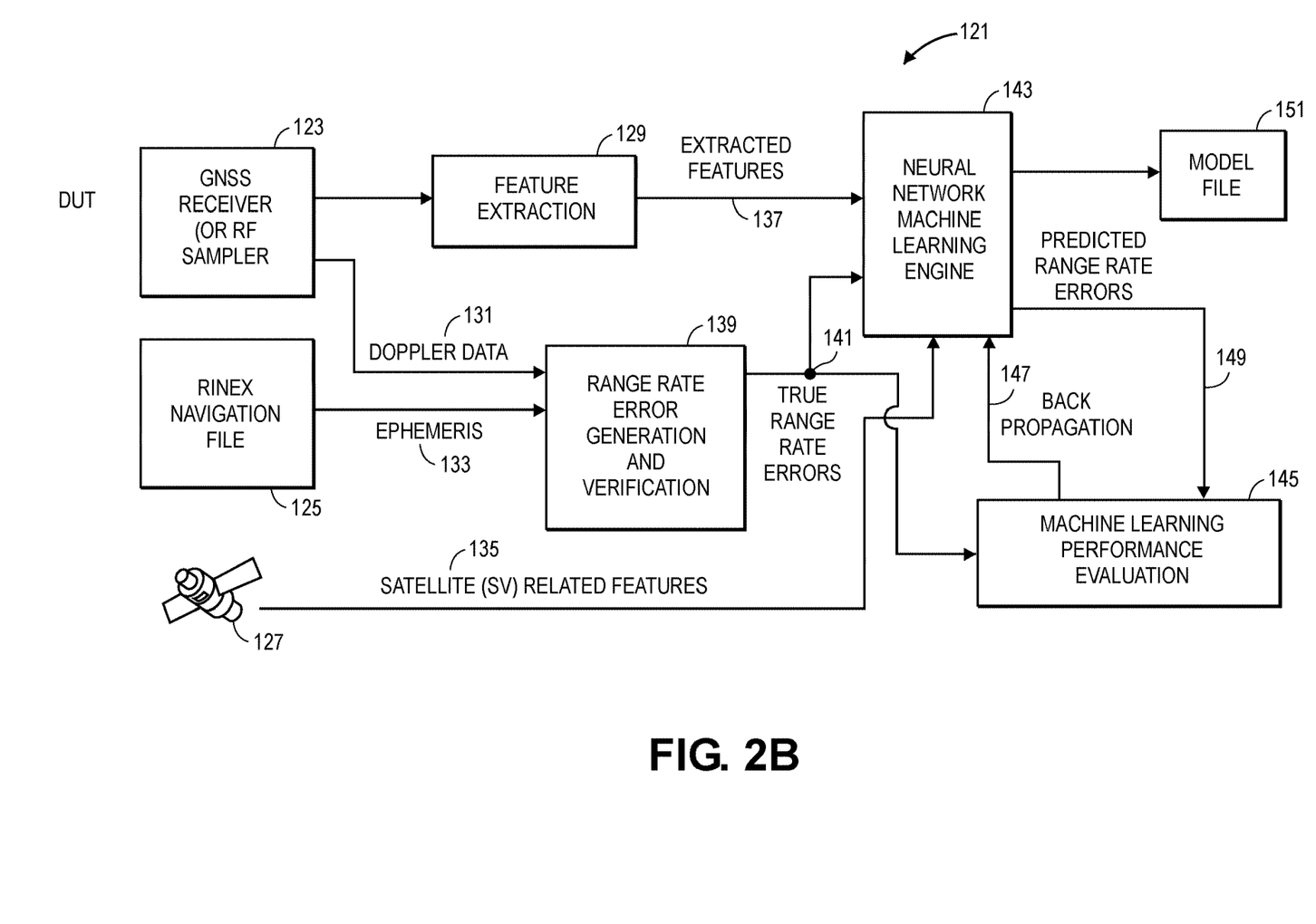
FIG. 2B shows another example of an embodiment that can be used to generate true range rate error data and generate a trained model (e.g., a set of one or more deep neural networks).

The system 35 shown in FIG. 1B or the system 121 shown in FIG. 2B can use the method shown in FIG. 2A to create a trained model. The method in FIG. 2A can begin in operation 101 which involves setting up a DUT GNSS receiver and a reference GNSS receiver (which can include an integrated INS and odometer) in a vehicle so that the two GNSS receivers are co-located in the vehicle. In one embodiment, the two GNSS receivers may share the same GNSS antenna. The vehicle can be used to move the two receivers through an environment, such as an urban canyon, to obtain measurements (while the vehicle is moved through the environment) that are collected and stored for later processing to train a model as described herein. The reference of "truth" receiver will provide accurate position and velocity data as a result of the INS system and will provide GNSS measurements (e.g., pseudoranges and Doppler measurements) in the same environment that contains the DUT GNSS receiver. Prior to moving the vehicle for data collection, the reference (or truth) GNSS receiver is initialized, in operation 103, with a known position at a known location (e.g., provided by a mapping service); the INS system is initialized at this point so that it will provide an accurate location while the vehicle moves around the environment. Once the reference receiver is initialized, the vehicle can be moved around the environment, and the DUT GNSS receiver and the reference GNSS receiver can begin receiving and processing GNSS signals and storing the data used to train the model. In operation 105, a data processing system retrieves the collected data and processes it to calculate true range rate errors (as further described below) so that a model can be trained as described herein.

FIG. 2B shows a more specific example of a system 121 for training a model according to one embodiment. This system can perform the methods shown in FIGS. 1A and 2A to train a model by creating a model file, such as model file 151, that stores the results of the training (e.g., a set of trained weights that implement a trained set of one or more neural networks). The system 121 can include a DUT GNSS receiver 123 that generates GNSS data provided to a feature extraction system 129 (that can perform operation 14 in FIG. 1A). The generated GNSS data includes all of the data needed as inputs to the feature extraction process (e.g., pseudorange measurements, carrier phase measurements, SNR measurements, frequency measurements of the received signals, pseudorandom code phase measurements, etc.). The DUT GNSS receiver 123 also provides Doppler measurements 131 that indicate the Doppler shifts (of the received GNSS signals) over a same time period as the GNSS data provided to the feature extraction unit 129. The reference GNSS receiver can (over the same period of time) receive and process the same GNSS signals from GNSS SVs and process these received signals to provide the data used to compute the true range rate errors for each GNSS signal; this data can be stored in a RINEX file 125, and this data can include ephemeris data 133 that is provided to a true range rate error generator 139 (which also receives the Doppler data 131). Another input is a source of satellite related data 135 from a source 127 of such data for the same period of time (which source may be known ephemeris data from existing sources for such data and also the reference receiver in the case of signal to noise ratio data). The feature extraction unit 129 can perform operation 14 in FIG. 1A to extract the features from the input data for each received GNSS signal (e.g., the E5A signal from a Galileo SV and the E5B signal from the same Galileo SV, etc.). The extracted features 137 are the output from feature extraction unit 129, and this output is one of the inputs to the neural network machine learning engine 143. The system may collect many minutes of GNSS data and then process the collected data to generate the true range rate data. The true range rate error generator 139 can perform operation 12 in FIG. 1A to generate the true range rate errors 141 for each signal, and these true range rate errors are provided as an input to the engine 143. The engine 143 can be a set of one or more neural networks (e.g., a deep neural network that has at least 2 hidden layers). The engine 143 can be trained over multiple training epochs by receiving different time slots of the set of extracted features and the corresponding true range rate errors and SV related data 135. The outputs 149 over the epochs are provided to a machine learning performance evaluator 145 (which is similar to discriminator 43 in FIG. 1B). The evaluator compares successive solutions to determine whether a solution has converged (which indicates that the engine produces predicted range rate errors that are within a desired threshold of the true range rate errors). With each epoch, the evaluator 145 can provide adjusted weights 147 that at back propagated through the engine 143 to train the engine. Once the evaluator determines that the solution has converged, the final weights for the engine 143 can be stored in the model file 151 that can be deployed and used in GNSS receivers at inference time (in order to allow such receivers to adjust their calculations of velocity based on the predicted range rate errors).

Figure 3:
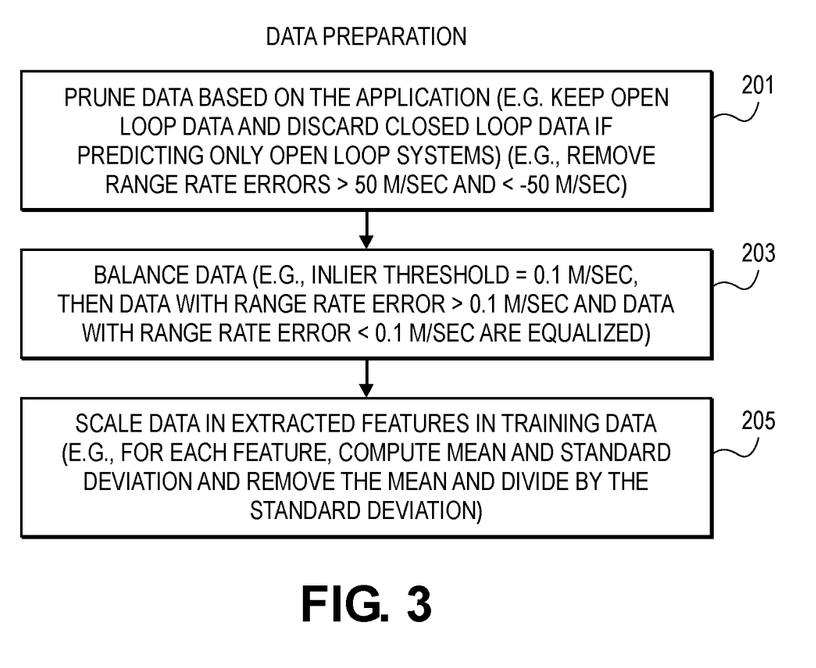
FIG. 3 is a flowchart that shows an example of a method to prepare data for training a model according to one embodiment.

In one embodiment, the data used to generate the extracted features can be preprocessed or prepared before the extraction process. This data preparation can be used both during training and at inference time (although at inference time, the scaling operations may not be performed). FIG. 3 shows an example of an embodiment that uses such data preparation. The method shown in FIG. 3 is performed before operation 14 in the method shown in FIG. 1A in a training embodiment and before operation 253 in the method shown in FIG. 4 in an inference embodiment that uses a trained model. Each group of data (each of the features) is preprocessed separately (e.g., the measured frequency values over time of received frequency for a particular GNSS signal from a particular GNS SV are preprocessed separately from other collected data values). In operation 201, data is pruned based upon the application and context; for example, if the target GNSS receiver (to be used at inference time) has only a closed tracking loop for tracking and measuring pseudoranges, then any open loop based data is discarded and is not applied to the model during the training process; also, outlier data may be removed (e.g., discard data with range rate errors exceeding 50 m/s and errors less than—50 meters/second (m/s). In operation 203, the data for a feature is balanced; in one embodiment, the amount of samples of data above a selected value and the amount of samples of data below the selected value is equalized or substantially equalized (e.g., within 10% of each other). For example, if an inlier threshold is defined to be 0.1 m/sec, then data with range rate error greater than this inlier threshold and data with range rate error less than this inlier threshold are equalized. This balancing of data can provide better training performance. In operation 205, a standardization method can be used for scaling of the data in a training embodiment. This can involve, for each feature, computing a mean and a standard deviation of the data for the feature and then removing the mean from the set of data for the feature and dividing each sample of data by the computed standard deviation.

Figure 4:
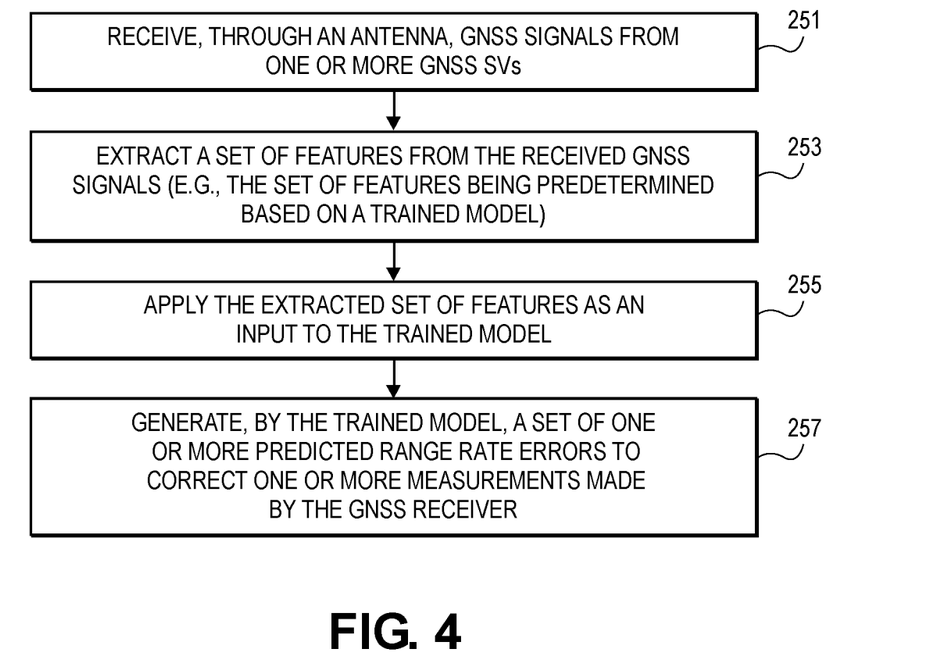
FIG. 4 is a flowchart that illustrates a method, according to an inference embodiment, for using a trained model to generate predicted range rate errors.
Figure 5:
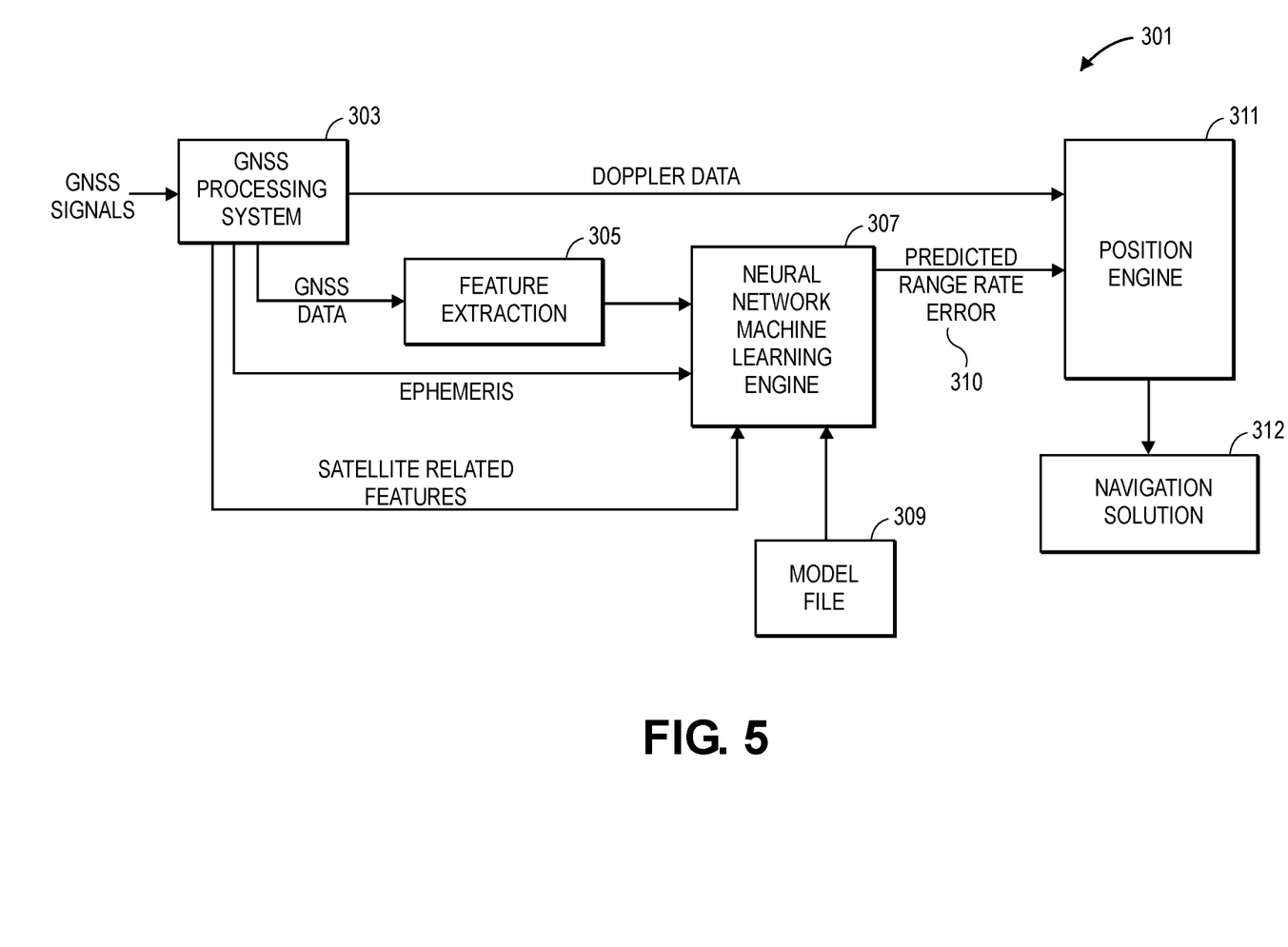
FIG. 5 is an example of an inference embodiment of a GNSS receiver that uses a trained model to generate predicted range rate errors.
Figure 6:
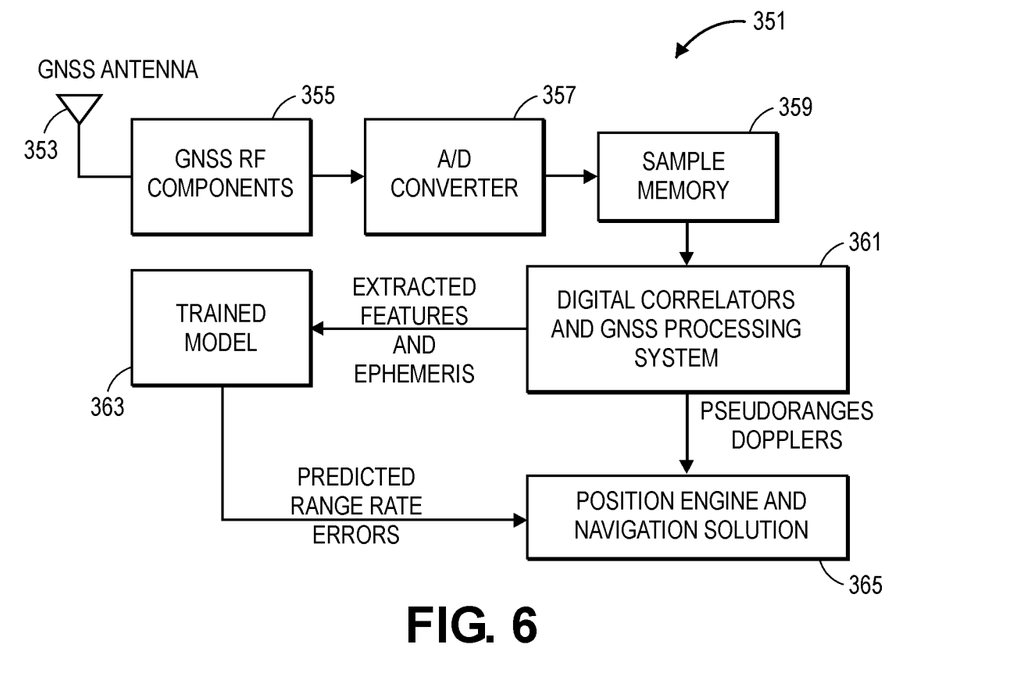
FIG. 6 shows another example of an inference embodiment of a GNSS receiver that uses a trained model to generate predicted range rate errors.

After a model has been trained, it can be used in an inference embodiment in a GNSS receiver, such as the GNSS receiver shown in FIG. 5 or FIG. 6. An example of a method according to an inference embodiment is shown in FIG. 4. In operation 251 in FIG. 4, a GNSS receiver can receive, through one or more antennas, GNSS signals. The received GNSS signals are then, in one embodiment, processed in operation 253 to extract a set of features (described herein); the set of features which are extracted are based on and predetermined by the trained model. For example, if the trained model (used in the GNSS receiver) was trained by using 7 features for each received GNS signal (e.g., mean frequency, standard deviation of frequency, SV elevation, SNR of GNSS receiver, mean pseudorange code phase measurement, mean Doppler, and standard deviation of carrier phase measurement), then those same features are extracted from the received GNSS signal. These extracted features are then applied as inputs to the trained model in operation 255. In operation 257, the trained model then generates a set of one or more predicted range rate errors based on the applied inputs. This set of one or more predicted range rate errors can then be used to adjust computed values for the GNSS receiver's velocity (e.g., in the case where the GNSS receiver uses Doppler measurements to compute the GNSS receiver's velocity).

FIG. 5 shows an example of a GNSS receiver 301 that includes a trained model specified by a model file 309. The GNSS receiver 301 can perform the method shown in FIG. 4. The GNSS processing system 303 receives GNSS signals from a source of such signals (e.g., a set of GNSS SVs in one or more constellations of GNSS SVs). The GNSS processing system 303 provides Doppler measurements and pseudorange code phase measurements to a position engine 311. The GNSS processing system 303 also generates and provides, to the feature extractor 305, the GNSS data for each feature used in the trained model 307 for each received GNSS signal during a period of time. The GNSS data provided as inputs to the feature extractor depends on the features used to train the trained model (as specified in the model file 309) as explained above. The feature extractor 305 computes each value for an extracted feature (e.g., feature extractor computes a mean frequency for the particular GNSS signal) to generate a set of extracted features for each of the received GNSS signals. These extracted features from the feature extractor 305 are provided as inputs to the trained model 307 (which has been configured based on the model file 309). In one embodiment, the trained model 307 is a set of one or more deep neural networks which can have more than 2 hidden layers (e.g., 5 hidden layers). The trained model also receives, as inputs, ephemeris data for each GNSS SV that has provided GNSS signals used to create the extracted features; this ephemeris data provides the position of the SV at any given time. The trained model also receives satellite related features that are used by the model (e.g., elevation for each SV and signal-to-noise (SNR) ratio for each GNSS signal). Based on these inputs to the trained model 307, the trained model 307 generates a predicted range rate error for a particular GNSS signal which is supplied to a position engine 311 that calculates a position from the measured pseudoranges and ephemeris data. The position engine 311 can use conventional approaches (known in the art) to compute a position from the measured pseudoranges and the ephemeris data. The position engine can use the predicted range rate error to adjust or weight the Doppler data so that the velocity of the GNSS receiver can be adjusted based on the adjusted Doppler data. In one embodiment, the predicted range rate error can be used to compute a Doppler error (indicating the error in the measured Doppler for a particular GNSS signal), and this computed Doppler error is then used to apply a weight to computed velocity values (where the weight is used to assess the influence the computed velocity value has relative to computed velocity values from other GNSS signals). For example, a lower weight for a first GNSS signal relative to a higher weight for a second GNSS signal can indicate that the second GNSS signal provides a more accurate Doppler measurement that should be accorded more weight when computing the GNSS receiver's velocity. The position engine 311 then provides an output of the computed position to a navigation solver 312 that generates the final position. The GNSS receiver can use a conventional navigation solver that includes a Kalman filter to compute the final position based on the position data over time from the position engine 311.

FIG. 6 shows another example of a GNSS receiver 351 that includes a trained model 363 according to one embodiment. The GNSS receiver 351 can perform the method shown in FIG. 4 to use predicted range rate error to adjust velocity values; in one embodiment, the predicted range rate errors can be used to assign weights to Doppler measurements that will be used to compute the GNSS receiver's velocity. One or more Doppler measurements with the highest weights can influence the computation of the velocity more than Doppler measurements with lower weights; for example, only the highest weighted Doppler measurement (with the smallest predicted range rate error relative to other range rate errors for other GNSS signals) can be used to compute the GNSS receiver's velocity (thereby ignoring the other Doppler measurements which are less accurate). The GNSS receiver 351 can receive GNSS signals from GNSS SVs through the GNSS antenna 353; those received signals can be amplified, filtered and downconverted by GNSS RF components 355 which provides an analog output to an analog-to-digital (A/D) converter 357. The digitized GNSS signals are then stored in a sample memory 359 for processing by a set of digital correlators and GNSS processing system 361; in one embodiment, the architecture of GNSS receiver 351 up to and including the digital correlators can be similar to one or more of the architectures of the GNSS receivers described in U.S. patent application Ser. No. 17/068,659, filed Oct. 12, 2020 by applicant oneNav, Inc. The GNSS processing system 361 is configured to perform the method shown in FIG. 4 by using the trained model 363 to generate predicted range rate errors. Thus, the GNSS processing system 361 can extract the features from the GNSS signals and provide those extracted features and ephemeris data (and other inputs as shown in FIG. 5) to the trained model 363 so that the trained model can generate the predicted range rate errors that are used by the position engine and navigation solution 365. In one embodiment, the position engine and navigation solution 365 can be similar to the position engine 311 and navigation solution 312 shown in FIG. 5.

While this description has focused on GNSS SVs and GNSS signals from GNSS SVs, the embodiments described herein can also be used with GNSS-like signals from terrestrial (e.g., ground based) transmitters of GNSS-like signals, such as pseudolites ("pseudo-satellite"). Thus, the embodiments described herein can be used in systems that use such terrestrial transmitters and receivers designed to receive and process GNSS-like signals from such terrestrial transmitters. The phrase "GNSS signals" will be understood to include such GNSS-like signals, and the phrase "GNSS SVs" will be understood to include such terrestrial transmitters.

The following section will describe a particular example according to one embodiment. This example provides further details about many aspects, including the structure of a neural network and training of the neural network. This example can use the method shown in FIG. 1A to train the neural network (in a training embodiment) and can use the method shown in FIG. 4 to use the trained neural network (in an inference embodiment).

Input Data for Model Training

The input data consists of the input features and output labels. Input features consists of 2 categories:
1—Satellite-related parameters
2—Receiver-related parameters (including parameters from outputs of phase lock loops (PLL) in the receiver).

The Satellite-related parameters can include:
SNR (signal to noise ratio)
Elevation of SV The Receiver-related parameters can include:
sigmaPLL (standard deviation of output of PLL used for carrier phase measurements)
CodeTrackNoise (the measured noise in the pseudorange tracking loop)
InLockAtStart (yes or no whether tracking of code phase is locked at start of data sampling)
DetectorSigmaPll (standard deviation of output of PLL
MeanHz (mean of received frequency for a GNSS signal)
SigmaHz (standard deviation of receiver frequency for a GNSS signal)
AvgDoppler (mean Doppler measurement for a GNSS signal)
MeanPr (mean pseudorange measurement); may include EPL corrections Note that these input features are chosen from among many numerical indicators that are available in the receiver. To this end, the correlation between each numerical indicator and the output label can be investigated. To this end, a "Random Forest Regression" is applied in one embodiment using below code:
my_model=RandomForestRegressor(n_estimators=100, random_state=0). fit(train_X, train_y)
perm=PermutationImportance(my_model, random_state=1). fit(val_X, val_y) eli5.show_weights (perm, feature_names=val_X.columns.tolist( ), top=100)
and the importance factor of each feature is calculated:

| Weight | Feature |
|---|---|
| 0.4665 ± 0.0129 | mMeanHz |
| 0.2682 ± 0.0294 | absVel |
| 0.1408 ± 0.0033 | mSigmaHz |
| 0.1149 ± 0.0051 | snr |
| 0.0807 ± 0.0057 | mCodeTrackNoise |
| 0.0588 ± 0.0047 | el |
| 0.0404 ± 0.0023 | mNewDoppler |
| 0.0381 ± 0.0021 | mAvgDoppler |
| 0.0186 ± 0.0020 | sigmaPLL |
| 0.0088 ± 0.0030 | mDetectorSigmaPll |
| 0.0066 ± 0.0008 | minLockAtStart |
| 0.0057 ± 0.0011 | mMeanPr |

Output Labels

The Output Labels are the Doppler measurement errors, that have been converted to the rate range domain using below formula:

Rate Range Error(m/s)=−(Doppler Error)*speed of light/frequency;

Where the speed of light is 299792458 and the frequency (in one embodiment) is 1176.45 MHz. These output labels represent the true range rate errors used in training. These labels can be computed similar to the EPL labels (described in U.S. provisional patent application No. 63/243,028 filed on Sep. 10, 2021). However, since the Doppler measurements are not corrupted by ionospheric and tropospheric delays, there is no need for a "base" receiver, as it was required in EPL computations. Rather, a simple Kalman filter can be applied to estimate the receiver clock drift, and accordingly, the measurement Doppler errors. Given that during the generation of the output labels, the position and velocity ground truths are known (e.g., from the reference GNSS receiver used in operations 101 and 103 in FIG. 2A), the only unknown is the receiver clock drift. Excess Path Length (EPL), which is a single number (in meters) that expresses the amount of multipath, can added to the pseudorange in one embodiment which uses the methodology detailed in the U.S. provisional patent application No. 63/243,028 filed on Sep. 10, 2021. In one embodiment, the computed true range rate errors are verified by "reapplying" them into the raw doppler measurements. Then, a simple WLS solver is used to compute x, y, and z-velocities as well as the receiver clock drift. The obtained residuals and the correctness of the estimated velocities verifies if the rate range errors are accurate or not accurate.

Machine Learning Engine

In one embodiment, a deep neural network is used and can include 5 hidden layers. The following provides information about an example of such a deep neural network. In this example, a machine learning platform known as TensorFlow is used.

Create and compile the model
model=Sequential( )
model.add(Dense(16, input_dim=X_Dim, activation='relu'))
model.add(Dense(32, activation='relu'))
model.add(Dense(128, activation='relu'))
model.add(Dense(64, activation='relu'))
model.add(Dense(32, activation='relu'))
model.add(Dense(4, activation='relu')) #model.add (Dropout (0.2))
model.add(Dense(1))
Below hyper-parameters are used to train the engine
opt=Adam(lr=1e-5, decay=1e-3/1)
model.compile(loss='mse', optimizer='adam', metrics= ['mae'])
model.compile (loss='mse', optimizer=opt, metrics= ['mae'])
model.summary( )
history=model.fit(x=X_train, y=y_train, validation_data= (X_test, y_test), epochs=200, batch size=256, callbacks=[tensorboard])

Computing the True Range Rate Error

The true range rate error can be computed by computing the following equation:

trueErr=pseudorangeRateMps−predictedRateMps

Where pseudorangeRateMps is the raw range rate measurement produced by the device under test (DUT) receiver, and predictedRateMps=rangeRateMps+(SVclockDrift− ReceiverClockDrift)

and where rangeRateMps is the difference between receiver's and SV's velocity projected into the line of sight vector, which can be computed by:

rangeRateMps=rangeRateMps+(SVclockDrift−ReceiverClockDrift)

rangeRateMps=[Vsv$_x$−Vrcv$_x$, Vsv$_y$−Vrcv$_y$, Vsv$_z$−Vrcv$_z$]. [G$_x$, G$_y$, G$_z$]

where G i-th row of the geometry matrix that correspond to the given SV.

The DUT Receiver's true position and velocity are expressed in ECEF (Earth-centered, Earth-fixed coordinate system) and at the received time. The DUT receiver's true position and velocity (at each time in a set of times) are known through (and extracted from) the ground truth file (e.g., a RINEX file that stores data created by the co-located reference receiver used in operations 101 and 103 in FIG. 2A). For an embodiment in which a CHIP antenna which may be used on the reference receiver and a Dipole antenna which may be used on the DUT receiver, the translation (in physical distance) between the antenna on the reference receiver and the DUT antenna should be applied when the reference receiver and the DUT receiver do not share the same antenna. The reference receiver can be connected to a survey grade antenna for the best possible truth position, with minimal multipath degradations, and best signal to noise ratio. The position of interest during training is the true position of the DUT antenna, not of the survey grade antenna. Knowing the 3D fixed distance between antennas in the vehicle frame, and the orientation of vehicle frame vs ECEF through INS, truth position at survey antenna is converted to a truth position at the DUT antenna. The velocity and position of the SVs must be expressed in ECI (Earth centered inertial coordinate system) frame and get transferred to ECEF frame; this step is done in order to account for the earth's rotation. The velocity, position and clock drift of the GNSS SVs can be computed from known sources of such information (e.g., BRDC files from NASA). The clock drift of the SV is assumed to be known from a RINEX (Receiver Independent Exchange Format) file. The clock drift of the DUT receiver is unknown; an EKF (extended Kalman filter) can be employed in a post processing operation to estimate it. In one embodiment, Doppler measurement outliers (e.g., larger than a threshold value) can be excluded to obtain a stable clock draft of the DUT receiver, and a smoothing algorithm can be applied to the Doppler measurements to make the estimated clock drift smoother. An algorithm can be used to align the time between the DUT receiver, the SV and the times in a Rinex file to account for the earth's rotation and signal travel time. For example, a well-known method uses an iterative algorithm to find the "travel-time", which is the amount of time between transmission of the signal by satellite and the reception of time by the receiver. By computing the travel time, it is possible to align the time between DUT, satellites, etc. This method has been fully explained in the following reference Springer Handbook of Global Navigation Satellite Systems, Peter Teunissen, Part D, pages 610-612.

What is claimed is:

1. A global navigation satellite system (GNSS) receiver comprising:
    an antenna to receive GNSS signals from GNSS satellites (SVs);
    a radiofrequency (RF) front end coupled to the antenna to amplify the GNSS signals;
    an analog to digital converter (ADC) coupled to the RF front end to generate a digital representation of received GNSS signals;
    a baseband memory coupled to the ADC to store the digital representation;
    a GNSS processing system coupled to the baseband memory to process the received GNSS signals, the GNSS processing system including a set of correlators that provide outputs that include correlation outputs;
    wherein the GNSS processing system includes processing logic to extract a set of features from the received GNSS signals, the set of features being predetermined based on a trained model in the GNSS receiver and being related to range rate errors;
    wherein the GNSS processing system includes processing logic to apply the set of features as an input to the trained model; and
    wherein the GNSS processing system includes processing logic to generate, by the trained model, a set of one or more predicted range rate errors to correct one or more measurements made by the GNSS receiver.

2. The GNSS receiver as in claim 1, wherein the GNSS processing system sets a pseudorange rate uncertainty based on the set of one or more predicted range rate errors.

3. The GNSS receiver as in claim 1, wherein the set of one or more predicted range rate errors is used to adjust for errors in Doppler measurements made by the GNSS receiver.

4. The GNSS receiver as in claim 1, wherein the set of features comprises one or more of: (1) a statistical computation of carrier phase measurements; (2) a statistical computation of pseudorange measurements; (3) a carrier to noise density ratio (C/NO); (4) an elevation of a GNSS satellite; (5) a signal to noise ratio of GNSS signals; (6) a statistical computation of frequency of received GNSS signals; (7) a statistical computation of Doppler measurements; or (8) a statistical computation of pseudorandom code phase measurements.

5. The GNSS receiver as in claim 4, wherein the statistical computation is either: (a) a standard deviation; or (b) a mean.

6. The GNSS receiver as in claim 4, wherein the trained model comprises one or more deep neural networks that comprises at least two hidden layers.

7. The GNSS receiver as in claim 6, wherein the processing logic prunes data in the set of features, balances data in the set of features, and scales data in the set of features.

* * * * *